(12) United States Patent
Rhodes

(10) Patent No.: US 8,184,069 B1
(45) Date of Patent: May 22, 2012

(54) SYSTEMS AND METHODS FOR ADAPTIVE TRANSMISSION OF DATA

(75) Inventor: Charles C. Rhodes, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/164,445

(22) Filed: Jun. 20, 2011

(51) Int. Cl.
G09G 5/00 (2006.01)

(52) U.S. Cl. ............................................ 345/8; 348/115

(58) Field of Classification Search .................. 345/7–9; 348/14.01, 14.03, 14.05, 14.12, 115; 359/630
See application file for complete search history.

(56) References Cited

U.S. PATENT DOCUMENTS

| | | |
|---|---|---|
| 5,745,380 A | 4/1998 | Sandvoss et al. |
| 6,009,435 A | 12/1999 | Taubin et al. |
| 6,028,608 A | 2/2000 | Jenkins |
| 6,252,989 B1 | 6/2001 | Geisler et al. |
| 6,263,022 B1 | 7/2001 | Chen et al. |
| 6,329,986 B1 | 12/2001 | Cheng |
| 6,445,679 B1 | 9/2002 | Taniguchi |
| 6,474,816 B2 | 11/2002 | Butler et al. |
| 6,829,391 B2 | 12/2004 | Comaniciu et al. |
| 7,024,046 B2 | 4/2006 | Dekel et al. |
| 7,116,833 B2 | 10/2006 | Brower et al. |
| 7,194,000 B2 | 3/2007 | Balachandran et al. |
| 7,206,804 B1 | 4/2007 | Deshpande et al. |
| 7,257,266 B2 | 8/2007 | Atsumi et al. |
| 7,324,695 B2 | 1/2008 | Krishnan et al. |
| 7,501,995 B2 | 3/2009 | Morita et al. |
| 7,508,988 B2 | 3/2009 | Hara et al. |
| 7,551,172 B2 | 6/2009 | Yaron et al. |
| 7,602,950 B2 | 10/2009 | Goldstein et al. |
| 7,624,918 B2 | 12/2009 | Sweeney et al. |
| 7,734,119 B2 | 6/2010 | Cheryauka et al. |
| 7,810,750 B2 | 10/2010 | Abreu |
| 7,826,531 B2 | 11/2010 | Wang et al. |

(Continued)

FOREIGN PATENT DOCUMENTS

EP 1739594 10/2009

(Continued)

OTHER PUBLICATIONS

Deforges, et al., "Region of interest coding for low bit rate image transmission", Published in 2000 IEEE Conference on Multimedia and Expo, Jul. 30-Aug. 2, 2000, pp. 107-110 of vol. 1. Retrieved on Mar. 1, 2011. Retrieved from the Internet at <URL: http://ieeexplore.ieee.org/xpl/freeabs_all.jsp?arnumber=869556>.

(Continued)

Primary Examiner — Regina Liang
(74) Attorney, Agent, or Firm — McDonnell Boehnen Hulbert & Berghoff LLP

(57) ABSTRACT

The present disclosure describes systems and methods for transmitting, receiving, and displaying data. The systems and methods may be directed to providing a constant or substantially constant data transmission rate (e.g., frame rate per second) to a device and controlling bandwidth by presenting information directed to an area of interest to a user. Bandwidth can be lowered, for example by presenting high resolution data directed to the area of interest to the user (e.g., an area to which the user is looking or "gazing" using a heads-up display), and lower resolution data directed to other areas. Data can be transmitted and received at a constant frame rate or substantially constant frame rate, and gaze direction and progressive compression/decompression techniques can be used to transmit data focused on areas directed to an area of interest to the user.

20 Claims, 9 Drawing Sheets

U.S. PATENT DOCUMENTS

| | | | |
|---|---|---|---|
| 7,839,926 | B1 | 11/2010 | Metzger et al. |
| 2006/0007056 | A1 | 1/2006 | Ou |
| 2007/0237402 | A1 | 10/2007 | Dekel et al. |
| 2008/0037880 | A1 | 2/2008 | Lai |
| 2008/0048930 | A1 | 2/2008 | Breed |
| 2008/0186254 | A1 | 8/2008 | Simmons |
| 2008/0259022 | A1 | 10/2008 | Mansfield et al. |
| 2009/0066782 | A1 | 3/2009 | Choi et al. |
| 2009/0181650 | A1 | 7/2009 | Dicke |
| 2010/0040151 | A1 | 2/2010 | Garrett |
| 2010/0050221 | A1 | 2/2010 | McCutchen et al. |
| 2010/0149073 | A1 | 6/2010 | Chaum et al. |
| 2010/0171700 | A1 | 7/2010 | Sharan et al. |
| 2011/0227820 | A1 | 9/2011 | Haddick et al. |

FOREIGN PATENT DOCUMENTS

| | | |
|---|---|---|
| JP | 2006229538 | 8/2006 |
| WO | WO 01/80561 | 10/2001 |
| WO | WO 2007/103889 | 9/2007 |

OTHER PUBLICATIONS

Dilmaghani et al., "Progressive medical image transmission and compression", Published in IEEE Signal Processing Letters, vol. 11, No. 10, pp. 806-809, Oct. 2004. Retrieved on Mar. 1, 2011. Retrieved from the Internet at <URL: http://rcstim.tums.ac.ir/db/papers/138.pdf>.

Mareboyana et al., "Web based progressive transmission for browsing remotely sensed imagery", Published in IEEE 2000 International Geoscience and Remote Sensing, vol. 2, pp. 591-593, Jul. 24-28, 2000. Retrieved on Mar. 1, 2011. Retrieved from the Internet at <URL: http://ieeexplore.ieee.org/xpl/freeabs_all.jsp?arnumber=861640>.

Loschky et al., "How late can you update gaze-contingent multiresolutional displays without detection?", Published in ACM Transactions on Multimedia Computing Communications and Applications, vol. 3, No. 4, 2007. Retrieved on Mar. 1, 2011. Retrieved from the Internet at <URL: http://krex.k-state.edu/dspace/bitstream/2097/2895/1/LoschkyACM2007.pdf>.

Chen et al., "Camera handoff with adaptive resource management for multi-camera multi-object tracking", Image and Vision Computing, vol. 28, Issue 6, Jun. 2010, pp. 851-864. Retrieved from the Internet: http://imaging.utk.edu/publications/papers/2010/ivc10-chc.pdf.

Reingold et al., "Gaze-contingent Multiresolutional Displays—An Integrative Review", Human Factors: The Journal of the Human Factors and Ergonomics Society, 2003; 45; p. 307-328. Retrieved from the Internet: http://hfs.sagepub.com/content/45/2/307.short.

Lo et al., "An Adaptive Source-Channel Coding with Feedback for Progressive Transmission of Medical Images", International Journal of Telemedicine and Applications, vol. 2009, Article ID 519417. Retrieved from the Internet: http://portal.acm.org/citation.cfm?id=1614186.

Cakmakci et al., "Head-Worn Displays: A Review", Journal of Display Technology, vol. 2, No. 3, pp. 199-216, Sep. 2006.

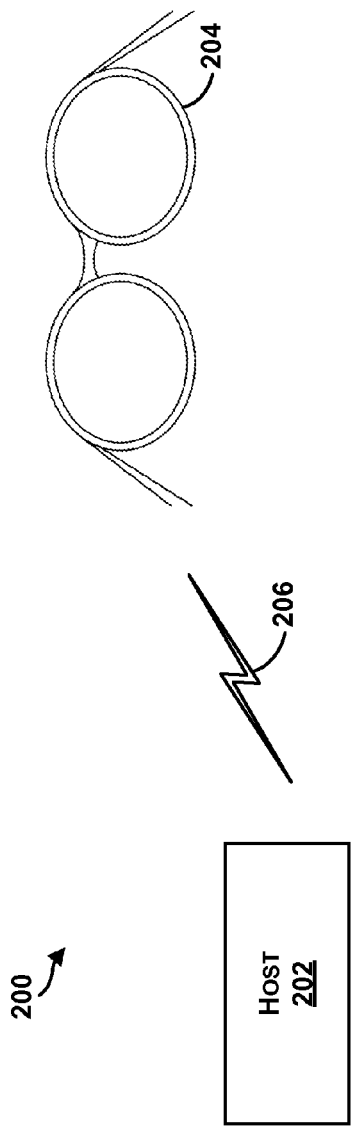
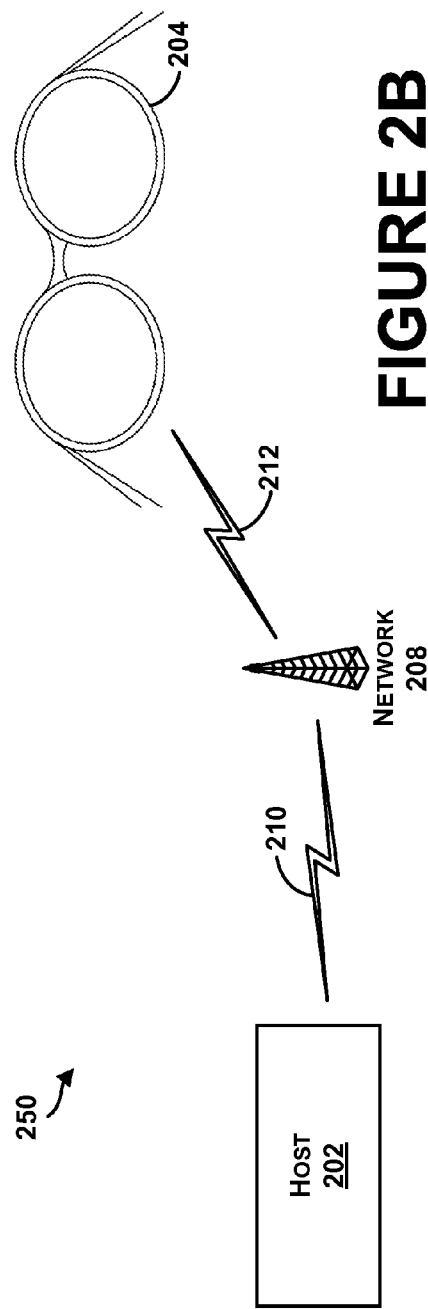

Computer Program Product 900

Signal Bearing Medium 901

Program Instructions 902

- receiving information indicating an image of interest associated with a device
- receiving prioritization instructions indicating a priority of contents of the image of interest
- based on the information indicating the image of interest and the prioritization instructions, determining an order of transmission of data associated with the image of interest
- sending data associated with the image of interest in the determined order such that data that pertains to the image of interest having a first priority is sent in a first time frame slot followed by data that pertains to the image of interest having a second priority in a second time frame slot, wherein the first priority is higher than the second priority
- progressively sending in the determined order additional data that pertains to the image of interest in subsequent time frame slots until completion of transmission of data associated with the image of interest or until receipt of another request for data from the device
- maintaining a substantially constant data transmission rate by controlling time allocated to encoding data for each time frame slot

| Computer Readable Medium 903 | Computer Recordable Medium 904 | Communications Medium 905 |

FIGURE 9

SYSTEMS AND METHODS FOR ADAPTIVE TRANSMISSION OF DATA

BACKGROUND

High resolution data or image streams can be provided by a host or transmitter to a display or receiver using a number of transmission techniques including wired or wireless connections. When a wireless connection is used, bandwidth available to transmit data may be more limited than when using a wired connection. In addition, bandwidth of a wireless connection can vary dynamically due to changing signal conditions. With limited bandwidth, compression schemes can be used to reduce the amount of data to be transmitted, but data compression can add latency, reduce frame rates, reduce image quality, and thus, cause a visual discomfort to the user of the system.

Various technologies can be utilized to receive data wirelessly and to display the data to a user of a system. Some systems for displaying information may utilize "heads-up" displays. A heads-up display is typically positioned near the user's eyes to allow the user to view displayed images or information with little or no head movement. To generate the images on the display, a computer processing system may be used. Such heads-up displays have a variety of applications, such as aviation information systems, vehicle navigation systems, and video games.

One type of heads-up display is a head-mounted display. A head-mounted display can be incorporated into a pair of glasses or a helmet that the user can wear. The display is typically calibrated and aligned in the user's field of view. Limited bandwidth between a heads-up display and a host or transmitter may cause problems when providing image streams to the heads-up display.

SUMMARY

The present application discloses, inter alia, systems and methods for transmitting, receiving, and displaying data.

In one example, a method for transmitting data is provided. The method comprises receiving information indicating an image of interest associated with a device, and the image of interest is within a field of view of the device. The method further comprises receiving prioritization instructions indicating a priority of contents of the image of interest, and based on the information indicating the image of interest and the prioritization instructions, determining an order of transmission of data associated with information the image of interest. The method also comprises sending data associated with the image of interest in the determined order such that data that pertains to the image of interest having a first priority is sent in a first time frame slot followed by data that pertains to the image of interest having a second priority in a second time frame slot, wherein the first priority is higher than the second priority. The method also comprises progressively sending in the determined order additional data that pertains to the image of interest in subsequent time frame slots until completion of transmission of data associated with the image of interest or until receipt of another request for data from the device, and maintaining a substantially constant data transmission rate by controlling time allocated to encoding data for each time frame slot.

In another example, an article of manufacture including a tangible computer-readable media having computer-readable instructions encoded thereon is provided. The instructions comprise instructions for receiving information indicating an image of interest associated with a device and the image of interest is within a field of view of the device. The method further comprises receiving prioritization instructions indicating a priority of contents of the image of interest, and based on the information indicating the image of interest and the prioritization instructions, instructions for determining an order of transmission of data associated with the image of interest. The instructions further comprise instructions for sending data associated with the image of interest in the determined order such that data that pertains to the image of interest having a first priority is sent in a first time frame slot followed by data that pertains to the image of interest having a second priority in a second time frame slot, and the first priority is higher than the second priority. The instructions further comprise instructions for progressively sending in the determined order additional information that pertains to the image of interest in subsequent time frame slots until completion of transmission of data associated with the image of interest or until receipt of another request for data from the device, and instructions for maintaining a substantially constant data transmission rate by controlling time allocated to encoding data for each time frame slot.

In another example, a system is provided that comprises means for receiving information indicating an image of interest associated with a device, and the image of interest is within a field of view of the device. The system also comprises means for receiving prioritization instructions indicating a priority of contents of the image of interest, and based on the information indicating the image of interest and the prioritization instructions, means for determining an order of transmission of data associated with the image of interest. The system further comprises means for sending data associated with the image of interest in the determined order such that data that pertains to the image of interest having a first priority is sent in a first time frame slot followed by data that pertains to the image of interest having a second priority in a second time frame slot, and the first priority is higher than the second priority. The system further comprises means for progressively sending in the determined order additional data that pertains to the image of interest in subsequent time frame slots until completion of transmission of data associated with the image of interest or until receipt of another request for data from the device, and means for maintaining a substantially constant data transmission rate by controlling time allocated to encoding data for each time frame slot.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 2A shows another example embodiment of a system for transmitting and receiving data.

FIG. 2B shows another example embodiment of a system for transmitting and receiving data.

FIG. 9 is a schematic illustrating a conceptual partial view of an example computer program product that includes a computer program for executing a computer process on a computing device, arranged according to at least some embodiments presented herein.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, systems and methods for transmitting, receiving, and displaying data. The systems and methods may be directed to providing a constant or substantially constant data transmission rate (e.g., frame rate per second) to a device and controlling bandwidth by presenting information directed to an area of interest to a user. Bandwidth can be lowered, for example, by presenting high resolution data directed to a high priority region of an image of interest to the user (e.g., an area to which the user is looking or "gazing" using a heads-up display), and lower resolution data directed to other areas. In one example, data can be transmitted and received at a constant frame rate or substantially constant frame rate, and gaze direction and progressive compression/decompression techniques can be used to transmit data in a prioritized manner focused on areas directed to the image of interest to the user or to transmit data that is directed to the image of interest of the user at a higher resolution.

In one example, in arrangements that have low-bandwidth transmission channels between a rendering engine and a display engine, e.g., a mobile device with a wireless connection to a heads-up display system, one or more of real-time, adaptive, or progressive compression/decompression techniques can be used to minimize computational effort and transmission bandwidth while providing a desired frame rate and resolution of images in a direction of a user's gaze or other proxy for a user's region of interest (ROI).

Figure 1:
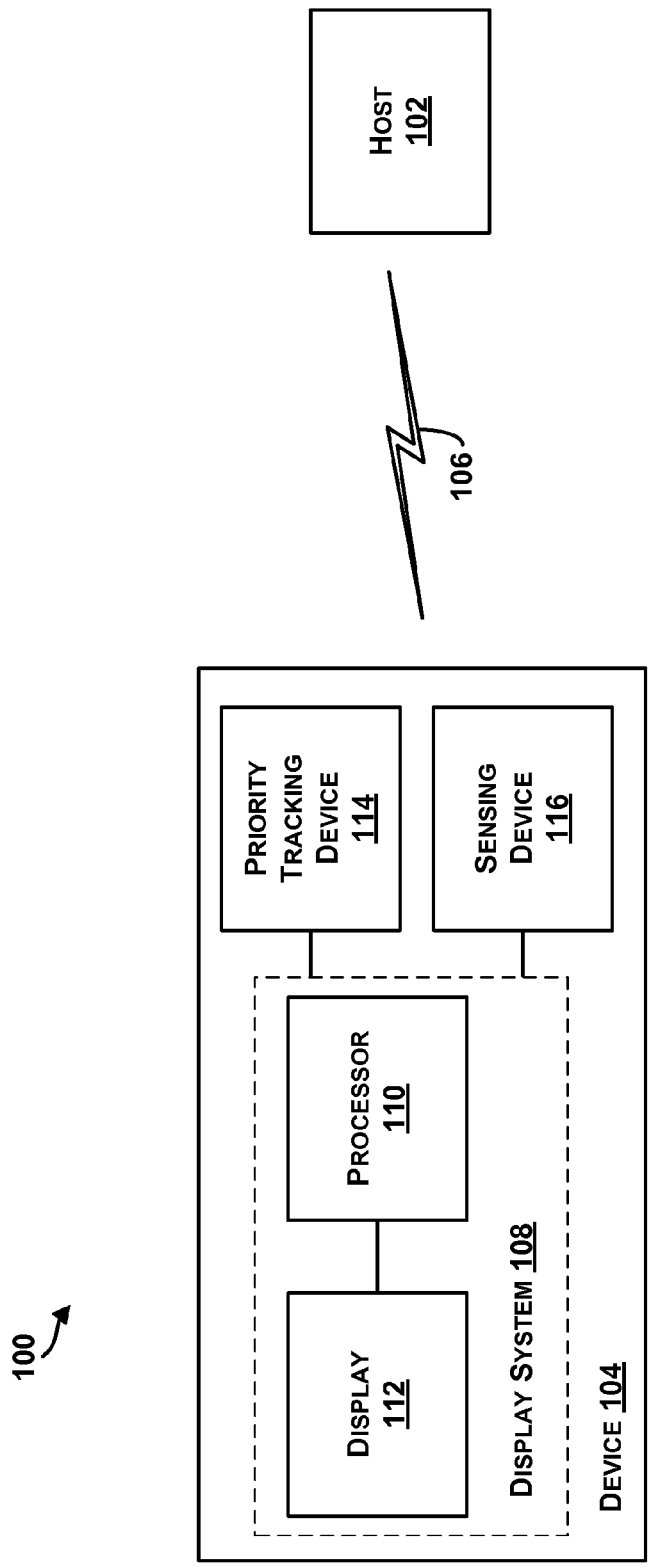
FIG. 1 illustrates an example system for transmitting and receiving data.

Referring now to FIG. 1, an example system 100 for transmitting and receiving data is illustrated. The system includes a host 102 that communicates using a communication link 106 (e.g., a wired or wireless connection) to a device 104. The host 102 may be any type of computing device or transmitter including a laptop computer, a mobile telephone, etc., that is configured to transmit data to the device 104. The host 102 and the device 104 may contain hardware to enable the communication link 106, such as transmitters, receivers, antennas, etc.

The device 104 may be any type of device that can receive data and display information corresponding to or associated with the data. For example, the device 104 may be a heads-up display system, such as glasses or any type of near eye display unit containing a display apparatus (e.g., a helmet, contact lens, and goggles). Further example embodiments may include a display comprising a liquid crystal display (LCD), light emitting diodes (LEDs), a molded polymer display, or a free space reflection display, or other means of image generation, for example. Additional example embodiments may include a waveguide in the display for generating images in front of the user's eyes. The display means and display housing are not meant to limit the scope of the present application.

In FIG. 1, the communication link 106 is illustrated as a wireless connection; however, wired connections may also be used. For example, the communication link 106 may be a wired link via a serial bus such as USB, or a parallel bus. A wired connection may be a proprietary connection as well. The communication link 106 may also be a wireless connection, such as Bluetooth, IEEE 802.11 (IEEE 802.11 may refer to IEEE 802.11-2007, IEEE 802.11n-2009, or any other IEEE 802.11 revision), or other wireless based communication links.

The device 104 may include a display system 108 with a processor 110 coupled to a display 112. The display system 108 may be configured to communicate (e.g., receive and transmit data wired or wirelessly) with the host 102. The processor 110 may receive data from the host 102, and configure the data for display on the display 112. The processor 110 may be any type of processor, such as a micro processor, a digital signal processor (DSP), etc., and the display 112 may be any type of display including LCD, plasma, etc.

The display system 108 may couple to a priority tracking device 114 and a sensing device 116. The priority tracking device 114 may be configured to determine a priority associated with images in a field of view of the device 104. In one example, the priority tracking device 114 may measure or receive information associated with a "gaze" direction, or direction of a user's gaze as determined by a direction where a user's eyeballs are pointing, for example. The display 112 may additionally or alternatively have an associated or designated area of interest or an image of interest that pertains to a user's desired or area of interest. For example, in the instance in which the display 112 is a heads-up display in a form of glasses, the image of interest may include images directed to an area in a direction to which the user is facing or looking, and such an area may be referred to as a gaze direction. The priority tracking device 114 may include many different types of sensors, such as accelerometers, gyroscopes, or GPS systems including compass-type sensors to determine a geographical direction and location, for example. In the instance in which the display system 108 is in a form of glasses worn by a user, the priority tracking device 114 may include sensors to analyze and interpret head movements so as to determine a head orientation to be associated with a prioritization of images, or other sensors (such as cameras) to analyze and interpret iris center positions with respect to eye corners to identify a gaze direction that coincides with eye movement, for example. Any type of priority tracking device may be used within the device 102 to identify and determine a gaze direction associated with the device 102, for example. In addition, a gaze direction may be determined using any combination of the above examples, such as by using a rotation of a viewer's eyes in the sockets as well as positioning of the device.

The priority tracking device 114 may also or alternatively be configured to determine a direction directed to a preferential interest in a particular area of a displayed image stream, or other "region of interest" or image of interest of a viewer. A point in an image in which the viewer is looking is an example region of interest, or additionally, the priority tracking device 114 may have information concerning an area of the screen that may be preferentially interesting to the viewer (e.g., something in a field of view has changed or is brought to the attention of the viewer). The priority tracking device 114 may also receive outputs from other sensors on the device 104 that may be used to indicate a preference for displayed data (e.g., the device 104 may include a microphone which records audio in another region of interest prompting updating of a visual display directed to the area from which the audio was received).

Thus, the priority tracking device 114 may determine an image of interest of the viewer using the device 104 and/or a gaze direction of the viewer using the device 104. In one example, the image of interest may lie in a direction in which the user is facing.

The sensing device 116 may be or include any number of sensors, or may have functionality of any number of sensors including, for example, an accelerometer, a gyroscope, an audio sensor, a video sensor (e.g., camera), a microphone, etc. Outputs of the sensing device 116 may indicate any one of eye movement, head movement, sources/direction/location of ambient audio, etc., and may be used to indicate a region of interest associated with the device 104.

One or more of the described functions of the system 100 may be divided up into additional functional or physical components, or combined into fewer functional or physical components. For example, although the priority tracking device 114 is illustrated as a component of the device 104, the priority tracking device 104 may be separate from the device 104, and thus, may communicate with the device 104. In some further examples, additional functional and/or physical components may be added to the examples illustrated by FIG. 1.

FIG. 2A shows another example embodiment of a system 200 for transmitting and receiving data. In the system 200, a host 202 is coupled to a display device 204 via a communication link 206. In this example, the display device 204 is glasses (e.g., a head-mounted display), and each lens of the glasses may include a display, and the communication link 206 is a wireless communication link.

FIG. 2B shows another example embodiment of a system 250 for transmitting and receiving data. In the system 250, the host 202 is coupled to a network 208 via a first communication link 210, and the network 208 may be coupled to the display device 204 via a second communication link 212. The display device 204 may contain hardware to enable a wireless communication link. The first communication link 210 may transfer data to the network 208 (e.g., an intermediary network between the host 202 and the display device 204). In some embodiments, the first communication link 210 may be provided by the internet. This may be a wired connection via coaxial cable, Ethernet cable, or telephone cable. The first communication link 210 may also be wireless (as shown), operating on an 802.11 WiFi protocol. In some embodiments, the network 208 may be a cellular based connection such as GSM, CDMA, UMTS, EV-DO, WiMAX, or LTE and may provide the second communication link 212. Additionally, the network 208 may provide the second communication link 212 by a different radio frequency based network, and may be any communication link of sufficient bandwidth to transfer images or data, for example.

Within either system illustrated in FIG. 2A or 2B, the display device may be configured to interpret received data and display images, text, or other information associated with the data. In addition, the display device 204 may be a heads-up display system including a priority tracker that provides gaze direction information to the host 202, and the host 202 may use the gaze direction information to prioritize coding and/or transmission of data to the display device 204.

Figure 3B:
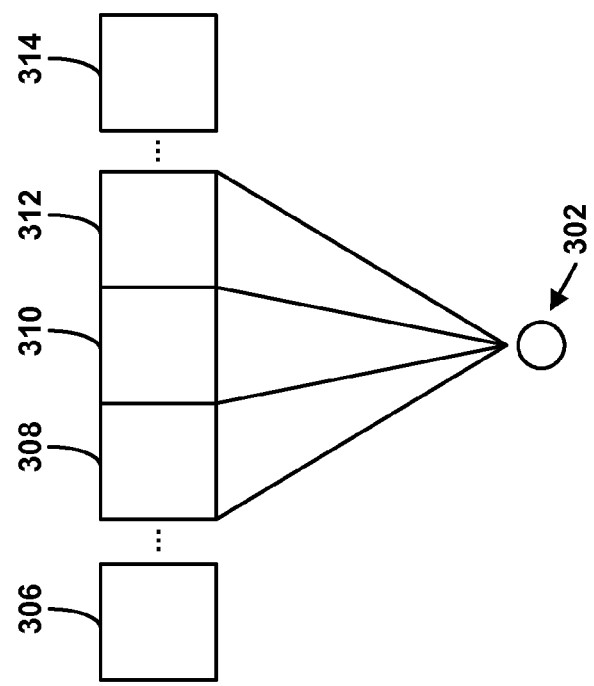
FIG. 3B illustrates another example of determining a gaze direction.
Figure 3A:
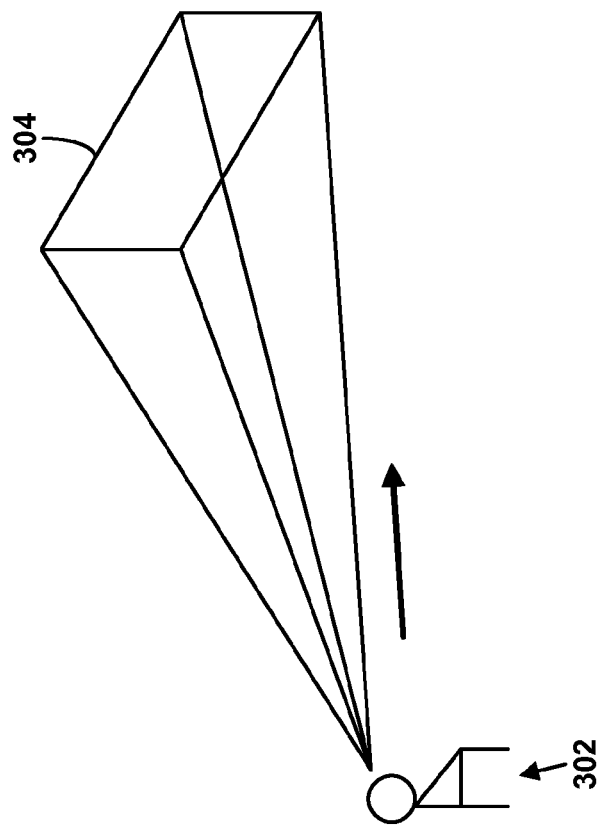
FIG. 3A illustrates an example of determining a region of interest or a gaze direction.

FIG. 3A illustrates an example of determining an image of interest, such as by determining a gaze direction. In FIG. 3A, a user 302 may be facing a direction as indicated by the arrow, and thus, the image of interest may be an image directed to a gaze direction in the direction of the arrow. The gaze direction may indicate a direction toward an area in which the user is looking. The user 302 may be looking at or interested in viewing an image of interest 304, and thus, the gaze direction may indicate a direction toward the image of interest 304. FIG. 3B is a top view of the user 302 and based on a viewing direction (or gazing direction) of the user 302, different images of interest 306, 308, 310, 312, and 314 may be indicated by different directions.

Referring back to the systems illustrated in FIGS. 2A and 2B, in the instance in which the user is wearing a heads-up display, such as display 204, the display 204 may receive information associated with an image of interest, based on a gaze direction of the user, and provide the image of interest to a transmitter to receive or request data corresponding to information about the image of interest, or additionally, to request or receive high resolution data corresponding to information about the image of interest and lower resolution data corresponding to information about other areas (e.g., a peripheral viewing area). Image of interest information may control content of data that is sent or received by the display 204. Without image of interest information, data corresponding to information about all areas around the display may be sent; however, using images of interest, less data can be sent and data of a higher interest to the user can be sent. Still further, data may be sent and received in an order of interest to the user prioritized, for example, based on gaze direction information. In a specific example, a user may wear glasses that include a heads-up display, and each head movement or possibly eye movement may cause a new image of interest. In an instance in which bandwidth is limited between a host and the glasses, data corresponding to information about an area directed to the image of interest can be sent first, followed by data corresponding to other areas. Upon receipt of new image of interest information, the host can begin transmission of new data, and thus, a display may change.

Figure 4:
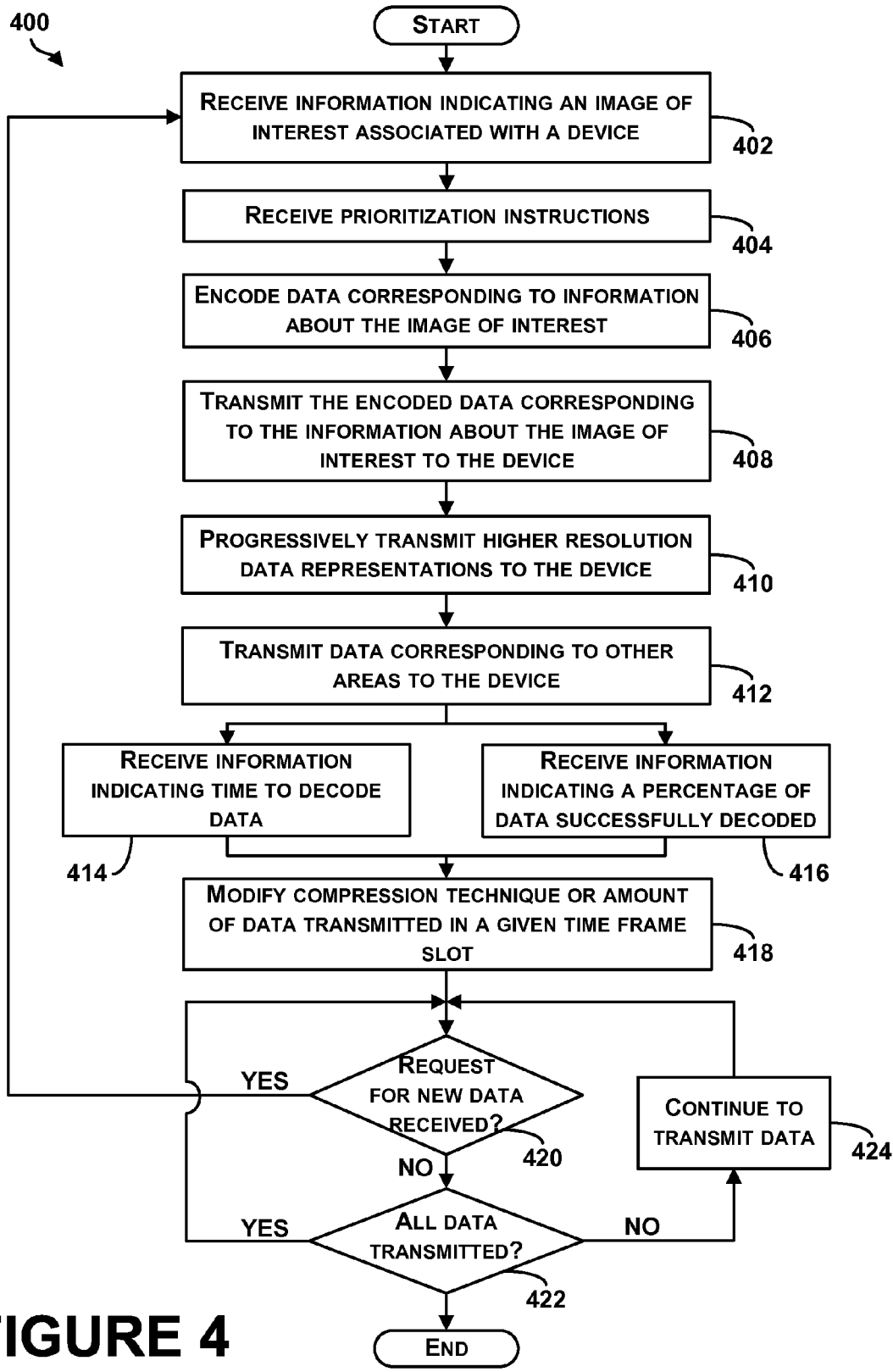
FIG. 4 is an example block diagram of a method to transmit data to a device, in accordance with at least some embodiments described herein.

FIG. 4 is an example block diagram of a method to transmit data to a device, in accordance with at least some embodiments described herein. Method 400 shown in FIG. 4 presents an embodiment of a method that, for example, could be used with the systems 100, 200, and 250, for example, and may be performed by a host, a device, or a combination of the host and the device. Method 400 may include one or more operations, functions, or actions as illustrated by one or more of blocks 402-422. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

The method 400 includes receiving information indicating an image of interest associated with a device, at block 402. For example, the device may include a gaze tracker and may determine a gaze direction of the device that can be sent (wired or wirelessly) to a transmitter as information indicating the image of interest. Alternatively, the device may include additional sensors, such as a compass and GPS, and may provide information indicating a direction that the device is facing as well as information indicating a location of the device or a gaze direction of the user of the device. Still further, the device may alternatively or additionally provide information indicating a region of interest (ROI) of the user as information indicating the image of interest. An ROI may be an area in front of the user, for example, or may be determined based on other indicators, such as outputs from other sensors of the device. In some examples, the image of interest is within a field of view of the device, or within a field of view of a user wearing the device. The image of interest information may further indicate a location or coordinates of the device, or specific camera parameters associated with the device such as a focal length and field of view, for example. Information associated with the image of interest can be used to send data associated with the image (e.g., pixel data) given a current location, orientation, setup, etc., of the device.

At block 404, the method 400 includes receiving prioritization instructions. In one example, the prioritization instructions indicate a priority of contents of the image of interest. In one example, an order of transmission of contents of the image of interest can be determined based on the prioritization instructions. Thus, a general image of interest can be identified, and the prioritization instructions can identify and indicate an order in which to transmit contents within the image of interest.

In one example, the prioritization instructions may include information indicating a gaze direction of a user of a heads-up-display. A user may be facing a particular direction, or the device may be facing a particular direction, and an image of interest including an area in the particular direction can be identified. Further, a user's gaze direction (e.g., based on eye movement) can be determined to identify at a more detailed level contents within the image of interest at which the user is interested. For example, if the user's image of interest is identified to be generally an area in front of the user and the user moves his/her eyes to a right-hand segment of the area in front of the user, content directed to the right-hand segment may be identified as a higher importance and can be transmitted to the user with a higher priority level than other content in the region of interest. The gaze direction information can be used to identify content in the image of interest centered around a single point in the image of interest indicated by the gaze direction.

As another example, a heads-up-display may include vision-based sensors that may identify moving objects, or audio sensors that may identify areas with localized sounds. Motion-based data or audio-based data may be included within the prioritization instructions, or may be used to generate the prioritization instructions, so as to indicate content directed to the motion or audio as having a higher priority level. For instance, upon spatially localizing audio in an ambient environment, content within the region of interest at or around the spatially localized audio can be identified so as to identify content in the vicinity of the sound. A direction of the audio or a location of the audio can be approximated and used to configure the prioritization instructions.

In still another example, a heads-up-display may include motion sensors, and may detect movement of a user. A motion sensor may determine that a user's head is moving rapidly to the right, and such information may be used as prioritization instructions to provide additional information for prioritizing data to send. Alternatively, a host may detect movement of the user's head to the right based on requests for information and analyzing images within the information (e.g., a host may analyze images/sequences transmitted to determine that a user is moving in a particular direction).

In yet another example, the prioritization instructions may include or be configured based upon a weighting function. Example weighting functions may consider many inputs, and based on the inputs, provide prioritization instructions. The inputs may include motion of the user, audio samples of ambient audio, a gaze direction of the user, etc. One specific weighting function may be configured such that if motion of a user is given a first priority, and a user's gaze direction is given a second lower priority.

Furthermore, the prioritization instructions may indicate two or more locations within the region of interest that have a high priority as compared to other areas in the region of interest. The locations can be identified based on a gaze direction, head movement, ambient audio, etc.

Within examples, the prioritization instructions may be considered feedback from the device to provide a second level of granularity of a particular image of interest. For instance, in addition to indicating an image of interest that may be used to determine a next frame to display, additional information can be provided to the host to guide the host in encoding and transmitting the information in the image of interest. In an augmented reality example using a heads-up-display, head movement may drive information to be displayed, however, in a limited bandwidth situation a user's gaze direction can also be helpful so that more of the transmitted information can be relevant for pixels in a center of the user's view. Other feedback including direction of movement of the user's head, a spatial location of sounds being detected from an ambient environment, or feedback from other sensors on the heads-up-display may be used to prioritize transmission of data.

At block 406, data corresponding to information about the image of interest may be encoded or compressed. A host or transmitter may compress data prior to transmission to the receiver or display. Any type of encoding or compression techniques may be used, such as for example, a wavelet based technique (e.g., such as discrete wavelet transform (DWT) or embedded zerotree wavelet (EZW)). In one example, an image may be reduced in size by averaging all pixels of the image, and averaging may be performed in an iterative manner until a size of data representing the image is as desired. In another example, using DWT or EZW, data may be coded and compressed at any bitrate into individual blocks or subblocks that can be transmitted individually. A DWT may be performed for each subblock of data to decompose the subblocks into different time-frequency components. Coefficients in low frequency subblocks may show background information of the subblocks, and coefficients in higher frequency subblocks may represent details and edges of images. After computing the DWT, the data can be compressed according to any type of compression technique, such as, a variable thresholding mechanism governed by the EZW in which coefficients that are larger than a threshold may be selected for transmission. A threshold level may determine a length of an output bitstream, a compression ratio of input data, and/or a resolution of reconstructed data, for example. For more information on encoding and compression techniques, reference is made to "An Adaptive Source-Channel Coding with Feedback for Progressive Transmission of Medical Images" by Lo, et. al., International Journal of Telemedicine and Applications, Vol. 2009, Article ID 519417, the entire contents of which are herein incorporated by reference.

At block 408, the encoded data corresponding to the information about the image of interest can be transmitted to a device. By transmitting data corresponding to information about the image of interest, the data that is transmitted is likely to be of interest to the user.

Optionally, at block 410, higher resolution data may be progressively transmitted to the device. For example, at block 406 and 408, data of a first resolution level may be encoded and transmitted to the device, and at block 410, data of a second resolution level higher than the first resolution may be encoded and transmitted to the device. Both the data transmissions may include data corresponding to the information about the image of interest and may specifically be directed based on the prioritization instructions. In this manner, initially, low resolution data (e.g., or highly compressed data) may be sent to the device so as to transmit low amounts of data more quickly, and then additional data can be progressively transmitted to the device to allow construction of a higher resolution of an image. The additional data subsequently transmitted can be data compressed using a lower amount of compression. In addition, if prioritization instructions (e.g., information indicative of a gaze direction) are provided to the transmitter, the transmitter may encode data representing information about the gaze direction in better quality and less distortion than data representing other areas. The device may initially decode and display a low resolution image, and after receipt of additional data, may decode and display a higher resolution image. The image may be revealed progressively; however, at any one point a reasonable reproduction of an original image can be displayed, for example.

At block 412, as another optional step, data corresponding to other areas can be sent to the device. For example, data corresponding to information about the image of interest of a first resolution can be sent to the device, followed by sending data corresponding to information about a remainder of areas near or around the user in a second resolution. The first resolution may be a higher resolution than the second resolution such that data corresponding to the image of interest can be rendered by the display in more detail. Still alternatively, the transmitter can send data in a prioritized manner by first sending data corresponding to information associated with the image of interest, and subsequently sending data corresponding to other areas, and all data can be sent in a high resolution or in multiple level resolutions in this alternative example.

Thus, using the priority information, an order of transmission of data associated with information of an area that pertains to the image of interest can be determined and data associated with information of the image of interest can be sent using a progressive compression technique such that low resolution data representations are sent in a first time frame slot followed by higher resolution data representations in a second time frame slot. For instance, high resolution data for high priority areas can be sent first, followed by high resolution data for lower priority areas.

At block 414, the method optionally includes receiving information indicating a time to decode data. The device may determine a time to decode received compressed data, and send an indication of the time to the transmitter. The time to decode may include a time to receive the data and/or time to decode and display the data. For instance, the data may include time stamps indicating a time when the data was transmitted, and thus, based on when the data was received, the device can determine a time to transmit the data. The time to transmit data may be used to estimate an amount of bandwidth available, or other signal conditions between the device and the transmitter.

At block 416, the method optionally includes receiving information indicating a percentage of data successfully decoded. The device may determine a percentage of data successfully decoded, and send an indication of the percentage to the transmitter.

At block 418, the method optionally includes modifying a compression technique or an amount of data transmitted in a given time frame slot. For example, based on the indications of one or more of the time to decode data and the percentage of data successfully decoded, the transmitter can modify how much data is sent to the device, such as, by modifying a compression technique used to encode the data.

At block 420, the method includes determining if a request for new data is received. For example, the device may send a request for new data, such as, by sending information associated with a new image of interest. In an instance in which the image of interest of the device or of the viewer using the device is changed, the new image of interest (or data associated with the new image of interest) can be sent to the transmitter to request new data corresponding to the new image of interest. As another example, if a position and/or orientation of a user's head has changed, a new image of interest may be sent to the transmitter to request new data whether or not a constant priority instructions are maintained.

At block 422, the method includes determining if all data corresponding to the information associated with the image of interest has been transmitted. If so, the transmitter has completed transmission of the data and waits for receipt of a request for new data at block 420. If not, at block 424, the transmitter may continue to progressively transmit data corresponding to information associated with the image of interest and/or corresponding to information associated to other areas.

In one example, in an instance in which the transmitter progressively transmits data corresponding to information about the image of interest, the transmitter can transmit additional data blocks in subsequent frame slots to eventually transmit a complete data stream for the image (or area) if no updates are received at the transmitter, as shown at blocks 420 and 422. Thus, in one example, certain data corresponding to information associated with the image interest may be preferentially transmitted, and other data associated with areas in a periphery of the image of interest can also be transmitted given enough time (i.e., data associated with a display may be completely transmitted, however a section of data for the display related to an image of interest may be transmitted preferentially). Thus, an order of transmission of data for an entire display can be determined with data directed to a high priority region or area being favored, for example. A complete data stream may include all data pertaining to the highest priority area and/or additional data pertaining to other areas.

Otherwise, upon receiving an update at block 420 (or request for additional or alternative data), coding could begin on a new or next data frame before a current data frame is completely encoded and transmitted.

The method 400 may be performed to progressively send additional information of the image in subsequent time frame slots until completion of transmission of data associated with the image or until receipt of another request for data from the device. Further, data can be transmitted in a prioritized manner by first sending data directed to the high priority regions of the image of interest followed by sending data directed to other areas.

Alternate embodiments of the method 400 may be performed by performing additional steps, removing steps, or performing steps in other orders. As one further example, the method 400 may be performed to transmit data directed to an image of interest at a predetermined resolution using a progressive compression technique while maintaining a constant or substantially constant data transmission rate. The method 400 may be performed independent of a type of information sent to the device, and gaze direction or other priority instructions sent from the device may be used to prioritize and order coding, transmission, decoding, and display of information content.

The method 400 may further be performed in a manner to maintain a substantially constant data transmission rate by controlling time spent on encoding and transmitting data for each time frame slot. The transmitter can maintain a constant or substantially constant data transmission rate to control bandwidth limitations.

Still further, within the method 400, in some examples, the prioritization instructions may be received after sending at least a portion of data associated with information of the image of interest in a determined order. In this example, a new order of transmission of data associated with the image of interest can be determined, and data associated with information of the image of interest can be transmitted in the new order. Thus, if the prioritization instructions change during a data transmission, e.g., a user's gaze changes, an order of data that is transmitted to the device can be modified accordingly.

Figure 5:
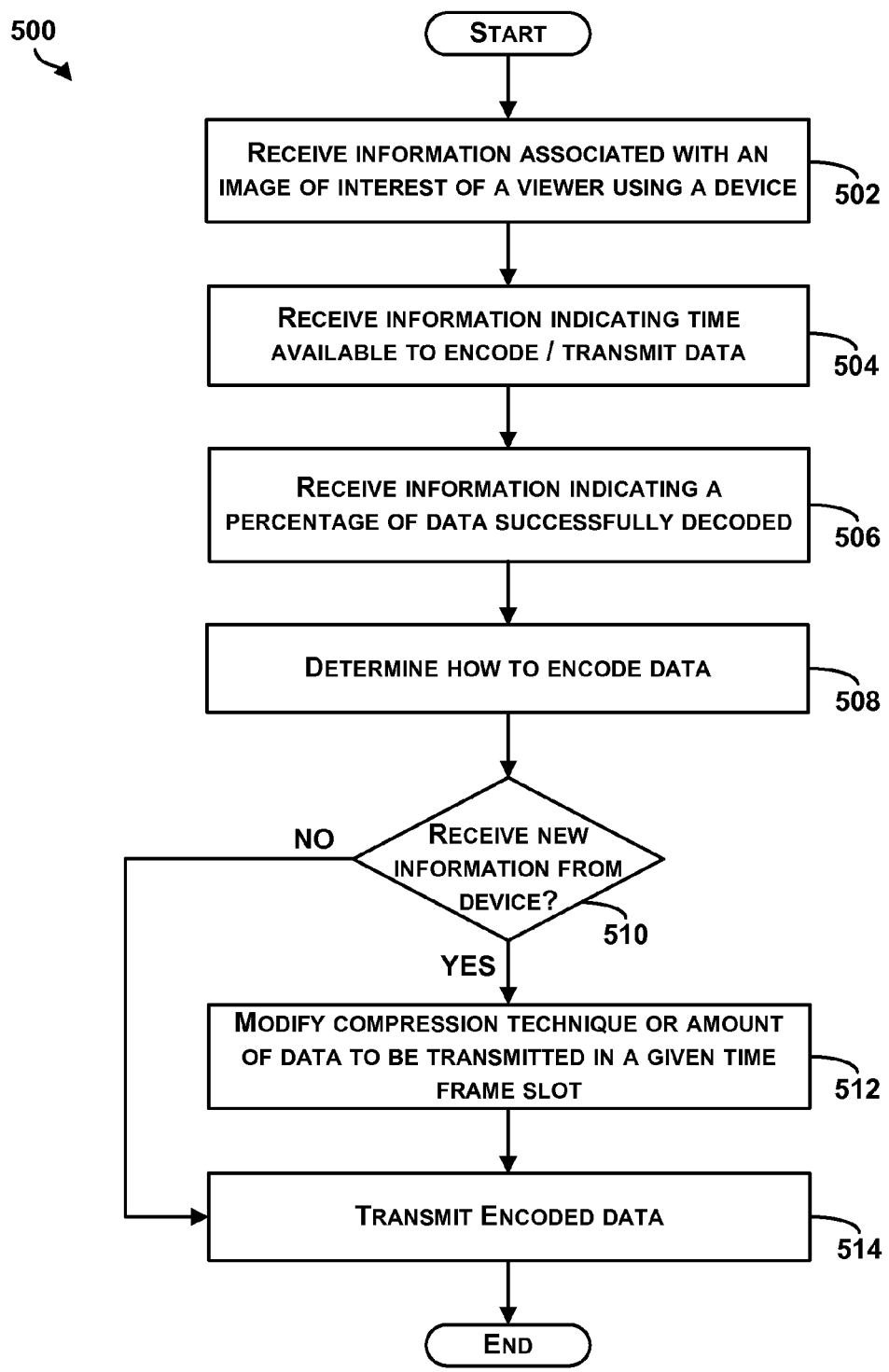
FIG. 5 is another example block diagram of a method to transmit data to a device, in accordance with at least some embodiments described herein.

FIG. 5 is an example block diagram of a method to transmit data to a device, in accordance with at least some embodiments described herein. Method 500 shown in FIG. 5 presents an embodiment of a method that, for example, could be used with the systems 100, 200, and 250, for example, and may be performed by a host, a device, or a combination of the host and the device. Method 500 may include one or more operations, functions, or actions as illustrated by one or more of blocks 502-514. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, information associated with an image of interest of a device or of a viewer using the device can be received at a transmitter, at block 502. The information associated with the image of interest may indicate a general direction a user or the device is facing, and/or may also indicate prioritization instructions pertaining to specific areas or contents within the image of interest. In addition, information indicating a time available to encode/transmit data can be received at the transmitter from the device, at block 504. Further, information indicating a percentage of data successfully decoded at the device from prior transmissions can be received at the transmitter, at block 506.

Following, the transmitter can determine how to encode data for transmission to the device, at block 508. For example, the transmitter can determine how to compress an image (i.e., how many bits of information to devote to each region of an image), based on an image of interest of a receiver or display, and/or based on how much time is available to perform one or more of encoding, transmitting, decoding, and displaying the image.

At block 510, if new information is received from the device, such as updated information indicating a new time available to encode/transmit data or a new percentage of information that is being successfully decoded at the device, the transmitter can modify compression techniques or amounts of data to be transmitted in a given time frame slot, at block 512. Subsequently, the transmitter can transmit the encoded data to the device. Receiving further feedback at the transmitter can be useful for throttling or expanding an amount of information transmitted during each time frame. A target data transmission rate can be achieved by restricting time spent on coding and transmitting data for each transmission frame at the transmitter, and also restricting time spent decoding and displaying data for each transmission frame on the device.

An approximate bandwidth between the transmitter and device can be updated on the fly (in real time), and used to estimate transmission time, and hence a size of encoded information to be sent in each frame slot, for example. In one example, to control bandwidth and maintain a substantially constant transmission frame rate, information from the device regarding the image of interest and past transmissions can be used. For example, as described, a region of interest in the image of interst can be used to determine how many bits of data to code to each region of an image so that information associated with the image interest can be encoded with more bits to provide more detail, and data representing other regions in a periphery can be encoded with less bits to provide less detail. Further, based on how much time is available to encode and transmit data (e.g., 15 ms to encode and transmit information), past transmission experiences can be used to determine how to encode data, such as to divide an image into sub-regions and transmit the image in parts, for example.

The method 500 provides an example to transmit different levels of detail of areas to a device in a specified amount of time so as to enable transmission of data within subsequent time frame slots to maintain a steady frame rate at an expense of resolution. The method 500 can be performed in real-time, and is adaptive based on feedback information received from the device (e.g., based in response to varying (wireless) bandwidth).

A closed loop between the device and the transmitter enables feedback to be communicated to each. Initial data transmission rates and amounts of data to be transmitted can be determined based on success of past transmissions, for example. Thus, a target frame rate can be achieved by restricting time spent on coding and transmitting each data frame. For more information on controlling bandwidth and maintaining a substantially constant data transmission rate, the reader is referred to "Gaze-contingent Multiresolutional Displays—An Integrative Review" by Reingold, et. al., Human Factors: The Journal of the Human Factors and Ergonomics Society, 2003; 45; p. 307-328, the entire contents of which are herein incorporated by reference.

Figure 6A:
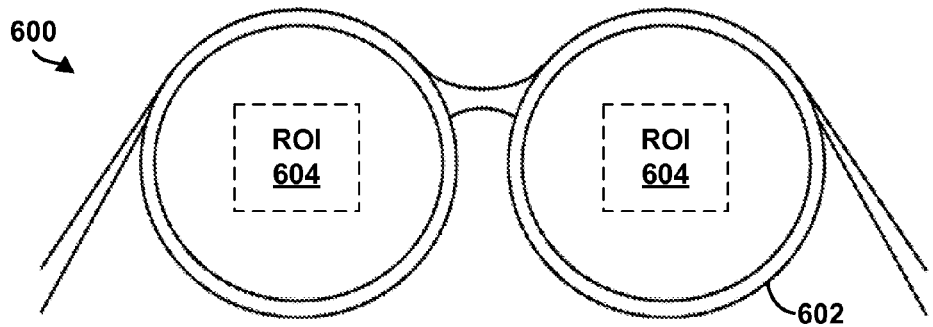
FIGS. 6A-6B illustrate examples of a device that may be configured to function according to one or more of the methods shown in FIGS. 4-5.

FIG. 6A illustrates one example of a device 600 that may be configured to function according to one or more of the methods 400 and 500. The device 600 is shown to be a heads-up-display device that can be worn by a user, such as glasses, to project images in front of eyes. The device 600 may have a wireless connection to phone, computer, etc., or other transmitter to receive data to be displayed. Bandwidth between the device 600 and the transmitter may be limited when using wireless transmissions (in contrast to use of wired connections that may provide more bandwidth, e.g., 60 fps, for high resolution video signals). In addition, the bandwidth can vary dynamically due to changing wireless signal conditions.

The device includes lens, such as lens 602, that include displays. A region of interest (ROI) 604 may be defined to include areas within a center of the lens 602, so as to define areas to which the user is looking or centering a view. The ROI may correspond to information indicating an image of interest of the user. Information indicating a direction or the ROI can be provided to the transmitter (e.g., such as location, latitude/longitude coordinates, compass direction, etc.) to enable the transmitter to send information corresponding to the ROI 604. In this manner, information of interest can be provided to the user.

Figure 6B:
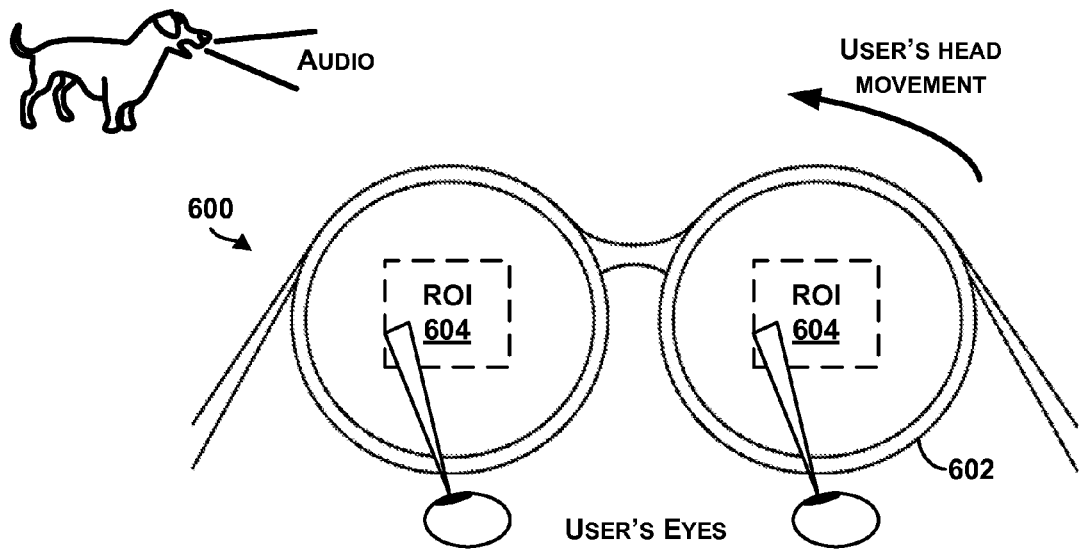

FIG. 6B illustrates an example of the device 600 worn by a user. In this example, a user's gaze direction may be determined based on movement of the user's eyes. The user's gaze direction may be determined to be toward a left-hand area of the ROI 604. In addition, sensors on the device 604 may determine a user's head movement to be moving to the left. Furthermore, audio sensors on the device 604 may detect audio in a direction to the left of the user. Any one or more of these pieces of information may be used to configure prioritization instructions to send to the host to request data associated with a specific area of the ROI 604. In this example, data associated with leftmost pixels of the image corresponding to the ROI 604 may be sent to the device 600 first, followed by data associated with pixels of other areas of the image corresponding to the ROI 604. Thus, an image corresponding to the ROI 604 can be displayed to the user by providing the data corresponding to an area of the user's gaze direction first, followed by data corresponding to a remainder of the ROI 604 (e.g., such as in a left-to-right rendering of the image).

Figure 6C:
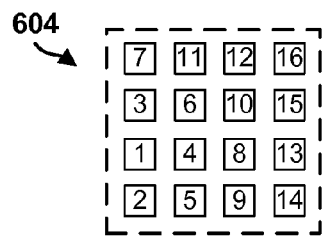
FIG. 6C illustrates an example of a region of interest (ROI).

FIG. 6C illustrates an example of the region of interest (ROI) 604, and the ROI 604 may be associated with or correspond to an image of interest. The ROI 604 may be divided into a number of areas, and contents associated with areas of the ROI 604 can be transmitted to the device 604 based on a prioritization. In the example shown in FIGS. 6A-6C, contents associated with area #1 may be transmitted first, since such contents may be directed to a gaze direction of the user, a motion of the user's head, and a direction of sensed audio. Contents associated with remaining areas may be transmitted in an order as shown from #2-#16, however, other orders are possible as well. In one example, contents within the ROI 604 may be transmitted based on an association to a distance to contents identified by the prioritization instructions. Using this example, contents within areas identified as #2-#6 are neighboring contents to the identified contents of area #1.

Using the examples in FIGS. 6A-6C, content of an image associated with data directed to a user's ROI and more specifically directed to a particular section of the ROI can be transmitted first so as to present content of sub-regions of particular interest to the user. Other content of the remaining sub-regions can be subsequently transmitted, and possibly other images associated with data directed to a remainder of a field of view can be further subsequently transmitted.

Figure 7:
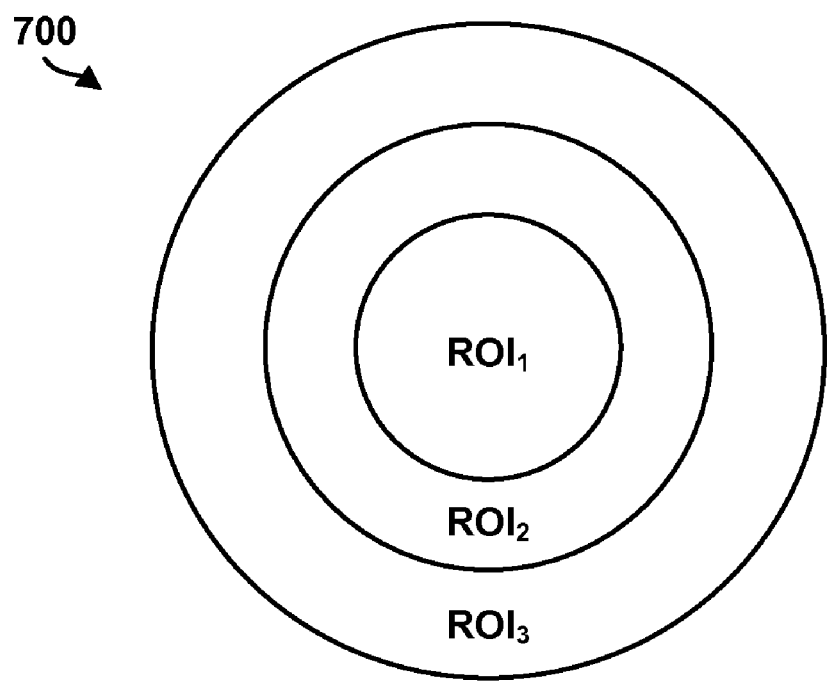
FIG. 7 illustrates a conceptual lens of a heads-up display.

FIG. 7 illustrates a conceptual lens 700 of a heads-up display. The lens 700 has been divided into multiple regions of interest, $ROI_1$, $ROI_2$, and $ROI_3$, and each ROI may be considered to be an image of interest to a user, or included within an image of interest of a user. Information indicating the different ROIs can be sent to the transmitter to enable the transmitter to prioritize transmission of data to the device. For example, the transmitter may use the ROI information to control compression and transmission of data as shown below in Table 1.

TABLE 1

|  | Order of Data Transmission | Amount of Data Transmitted |
| --- | --- | --- |
| $ROI_1$ | 1 | High Resolution/Low compression |
| $ROI_2$ | 2 | Medium Resolution/Medium compression |
| $ROI_3$ | 3 | Low Resolution/High compression |

Initially, data representing information in $ROI_1$ may be sent, followed by data representing information in $ROI_2$, followed by data representing information in $ROI_3$. Similarly, the ROIs may be used to determine how much data to be sent to the device. As shown in Table 1, high resolution/low compression data may be sent for information in $ROI_1$, medium resolution/medium compression data may be sent for information in $ROI_2$, and low resolution/high compression data may be sent for information in $ROI_3$. Using this example, images in a center of a view of the user may be displayed in high detail, while images surrounding the center and to the periphery may be displayed in lower detail.

A region of interest, such as those shown in FIG. 7, may be determined using other methods as well. For example, the region of interest may be further identified based on a viewer of a device, and thus, may be determined based on eye movement, head movement, or inputs from the viewer of the device. In another example, the region of interest may be based on the device, and thus, may be determined based on outputs of sensors coupled to the device, such as gyroscopes, accelerometers, cameras, microphones, etc. Any of these example sensors may provide an output that can be used to indicate a region of interest.

Figure 8:
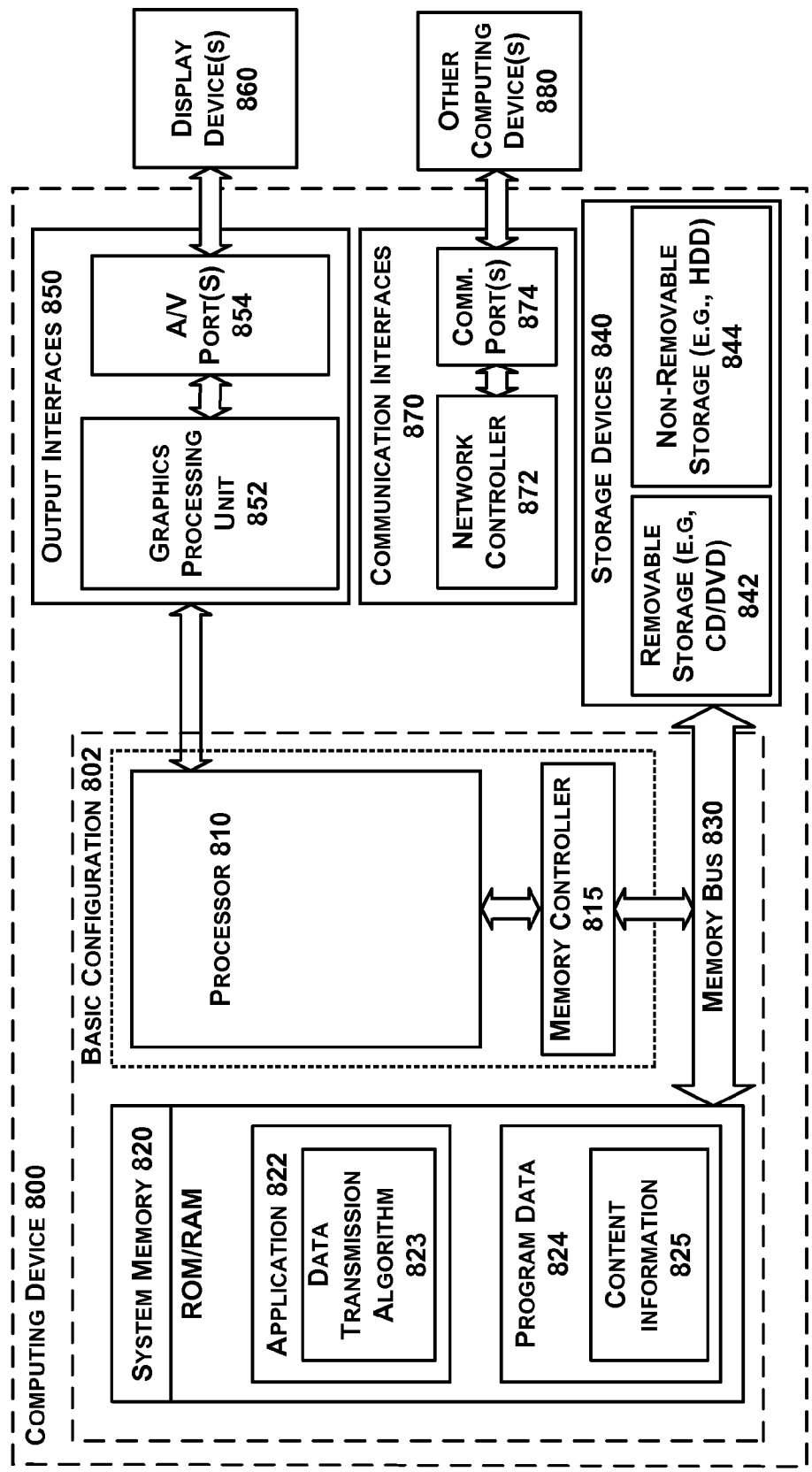
FIG. 8 is a functional block diagram illustrating an example computing device used in a computing system that is arranged in accordance with at least some embodiments described herein.

FIG. 8 is a functional block diagram illustrating an example computing device 800 used in a computing system that is arranged in accordance with at least some embodiments described herein. The computing device may be a personal computer, mobile device, cellular phone, video game system, or global positioning system, and may be implemented as a display device, a transmitter, a host, or a portion of a display device, transmitter, or host as described in FIGS. 1-7. In a very basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor (µP), a microcontroller (µC), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include an image display algorithm 823 that is arranged to provide inputs to the electronic circuits, in accordance with the present disclosure. Program Data 824 may include content information 825 that could be directed to any number of types of data. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include output interfaces 850 that may include a graphics processing unit 852, which can be configured to communicate to various external devices such as display devices 860 or speakers via one or more A/V ports or a communication interface 870. The communication interface 870 may include a network controller 872, which can be arranged to facilitate communications with one or more other computing devices 880 over a network communication via one or more communication ports 874. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

In some embodiments, the disclosed methods may be implemented as computer program instructions encoded on a computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein. In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. Thus, for example, referring to the embodiments shown in FIGS. 4 and 5, one or more features of blocks 402-422 and/or blocks 502-514 may be undertaken by one or more instructions associated with the signal bearing medium 901.

In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 802.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method for transmitting data, comprising:
receiving information indicating an image of interest associated with a head-mounted display device, wherein the image of interest is within a field of view of the head-mounted display device;
receiving prioritization instructions indicating a priority of contents of the image of interest;
based on the information indicating the image of interest and the prioritization instructions, determining an order of transmission of data associated with the image of interest;
sending data associated with the image of interest in the determined order such that data that pertains to the image of interest having a first priority is sent in a first time frame slot followed by data that pertains to the image of interest having a second priority in a second time frame slot, wherein the first priority is higher than the second priority;
progressively sending in the determined order additional data that pertains to the image of interest in subsequent time frame slots until completion of transmission of data associated with the image of interest or until receipt of another request for data from the head-mounted display device; and
maintaining a substantially constant data transmission rate by controlling time allocated to encoding data for each time frame slot.

2. The method of claim 1, wherein sending data comprises wirelessly sending data to the head-mounted display device.

3. The method of claim 1, wherein the head-mounted display device includes a heads-up display.

4. The method of claim 1, further comprising:
receiving information indicating one or more of a location of the head-mounted display device and a gaze direction associated with the head-mounted display device; and
based on one or more of the location of the head-mounted display device and the gaze direction associated with the head-mounted display device, determining the order of transmission of data associated with the image of interest.

5. The method of claim 1, wherein the head-mounted display device includes a head-mounted display, and wherein data associated with the image of interest is determined based on a head orientation of a user of the head-mounted display.

6. The method of claim 1, further comprising sending data associated with the image of interest in the determined order based additionally on one or more information received from the head-mounted display device indicating a time to decode received data and a percentage of received data successfully decoded.

7. The method of claim 1, further comprising determining the order of transmission of data associated with the image of interest based also on one or more information received from the head-mounted display device including a time to decode received data and a percentage of received data successfully decoded.

8. The method of claim 1, wherein sending data associated with the image of interest in the determined order comprises sending prioritized subsets of data of the image of interest, and wherein the method further comprises determining how to encode data for transmission to the head-mounted display device based on one or more of the prioritized subsets of data, a time to decode received data at the head-mounted display device, and a percentage of received data at the head-mounted display device successfully decoded.

9. The method of claim 1, further comprising upon receiving another request for data from the head-mounted display device, encoding and sending data associated with information of the another request even if encoding and transmission of data associated with information of a data frame currently being encoded and transmitted is not completely encoded and transmitted.

10. The method of claim 1, wherein the prioritization instructions indicating the priority of contents of the image of interest include one or more of a location associated with audio captured by the head-mounted display device, and a direction associated with motion of the head-mounted display device.

11. The method of claim 1, wherein the prioritization instructions indicating the priority of contents of the image of interest are based on a weighting function taking into account one or more of a gaze direction associated with a user of the head-mounted display device, a location associated with audio captured by the head-mounted display device, and a direction associated with motion of the head-mounted display device.

12. The method of claim 1, wherein the information indicating the image of interest indicates one or more of a location of the head-mounted display device and a direction that the head-mounted display device is pointing, and wherein determining the order of transmission of data associated with the image of interest comprises:
identifying contents of the image of interest that are associated with the prioritization instructions; and
prioritizing the identified contents ahead of other contents of the image of interest.

13. The method of claim 1, further comprising:
receiving the prioritization instructions indicating the priority of contents of the image of interest after sending at least a portion of data associated with the image of interest in the determined order;
based on the prioritization instructions, determining a new order of transmission of data associated with the image of interest; and
sending data associated with the image of interest in the new order.

14. An article of manufacture including a tangible computer-readable memory having computer-readable instructions encoded thereon, the instructions comprising:
instructions for receiving information indicating an image of interest associated with a head-mounted display device, wherein the image of interest is within a field of view of the head-mounted display device;
instructions for receiving prioritization instructions indicating a priority of contents of the image of interest;
based on the information indicating the image of interest and the prioritization instructions, instructions for determining an order of transmission of data associated with the image of interest;
instructions for sending data associated with the image of interest in the determined order such that data that pertains to the image of interest having a first priority is sent in a first time frame slot followed by data that pertains to the image of interest having a second priority in a second time frame slot, wherein the first priority is higher than the second priority;
instructions for progressively sending in the determined order additional data that pertains to the image of interest in subsequent time frame slots until completion of transmission of data associated with the image of interest or until receipt of another request for data from the head-mounted display device; and instructions for maintaining a substantially constant data transmission rate by controlling time allocated to encoding data for each time frame slot.

15. The article of manufacture of claim 14, further comprising instructions for:
receiving information indicating one or more of a location of the head-mounted display device and a gaze direction associated with the head-mounted display device; and
based on one or more of the location of the head-mounted display device and the gaze direction associated with the head-mounted display device, determining the order of transmission of data associated with the image of interest.

16. The article of manufacture of claim 14, further comprising instructions for:
receiving the prioritization instructions indicating the priority of contents of the image of interest after sending at least a portion of data associated with the image of interest in the determined order;
based on the prioritization instructions, identifying contents of the image of interest that are associated with the prioritization instructions;
prioritizing the identified contents ahead of other contents of the image of interest;
based on the prioritization, determining a new order of transmission of data associated with the image of interest; and
sending data associated with the image of interest in the new order.

17. The article of manufacture of claim 14, further comprising instructions for sending data associated with the image of interest in the determined order based additionally on one or more information received from the head-mounted display device indicating a time to decode received data and a percentage of received data successfully decoded.

18. The article of manufacture of claim 14, further comprising instructions for determining the order of transmission of data associated with the image of interest based also on one or more information received from the head-mounted display device including a time to decode received data and a percentage of received data successfully decoded.

19. A system comprising:
means for receiving information indicating an image of interest associated with a head-mounted display device, wherein the image of interest is within a field of view of the head-mounted display device;
means for receiving prioritization instructions indicating a priority of contents of the image of interest;
based on the information indicating the image of interest and the prioritization instructions, means for determining an order of transmission of data associated with the image of interest;
means for sending data associated with the image of interest in the determined order such that data that pertains to the image of interest having a first priority is sent in a first time frame slot followed by data that pertains to the image of interest having a second priority in a second time frame slot, wherein the first priority is higher than the second priority;
means for progressively sending in the determined order additional data that pertains to the image of interest in subsequent time frame slots until completion of transmission of data associated with the image of interest or until receipt of another request for data from the head-mounted display device; and
means for maintaining a substantially constant data transmission rate by controlling time allocated to encoding data for each time frame slot.

20. The system of claim 19, further comprising:
means for receiving information indicating one or more of a location of the head-mounted display device and a gaze direction associated with the head-mounted display device; and
based on one or more of the location of the head-mounted display device and the gaze direction associated with the head-mounted display device, means for determining the order of transmission of data associated with the image of interest.

\* \* \* \* \*